US009327950B2

(12) United States Patent
Mayer

(10) Patent No.: US 9,327,950 B2
(45) Date of Patent: May 3, 2016

(54) CRANE

(71) Applicant: Liebherr-Werk Biberach GmbH, Biberach an der Riss (DE)

(72) Inventor: Joachim Mayer, Biberach an der Riss (DE)

(73) Assignee: LIEBHERR-WERK BIBERACH GMBH, Biberach An der Riss (DE)

(*) Notice: Subject to any disclaimer, the term of this patent is extended or adjusted under 35 U.S.C. 154(b) by 273 days.

(21) Appl. No.: 14/032,040

(22) Filed: Sep. 19, 2013

(65) Prior Publication Data

US 2014/0083965 A1    Mar. 27, 2014

(30) Foreign Application Priority Data

Sep. 24, 2012 (DE) .................. 20 2012 009 167

(51) Int. Cl.
*B66C 23/02* (2006.01)
*B66C 23/88* (2006.01)
*B66C 23/84* (2006.01)
*B66C 23/94* (2006.01)
*B66D 5/02* (2006.01)
*B66D 5/04* (2006.01)
*F16D 63/00* (2006.01)
*F16D 121/22* (2012.01)

(52) U.S. Cl.
CPC .............. *B66C 23/88* (2013.01); *B66C 23/02* (2013.01); *B66C 23/84* (2013.01); *B66C 23/94* (2013.01); *B66D 5/026* (2013.01); *B66D 5/04* (2013.01); *F16D 63/006* (2013.01); *F16D 2121/22* (2013.01)

(58) Field of Classification Search
CPC ........ B66C 13/28; B66C 15/00; B66C 15/04; B66C 23/022; B66C 23/06; B66C 23/16; B66C 23/163; B66C 23/84; B66C 23/94; B66C 23/88; B66D 5/026; B66D 5/04; F16D 2121/22
See application file for complete search history.

(56) References Cited

U.S. PATENT DOCUMENTS

| 3,866,725 A | 2/1975 | Greutter |
| 8,074,816 B2 | 12/2011 | Philippon |
| 2009/0308827 A1* | 12/2009 | Philippon ............... B66C 23/94 212/294 |

FOREIGN PATENT DOCUMENTS

| CN | 101585487 A | 11/2009 |
| DE | 2210806 A1 | 11/1972 |
| DE | 2136928 | 2/1973 |
| DE | 2136928 A1 | 2/1973 |

(Continued)

OTHER PUBLICATIONS

The European Search Report dated Dec. 10, 2013.
(Continued)

*Primary Examiner* — Emmanuel M Marcelo
(74) *Attorney, Agent, or Firm* — Troutman Sanders LLP; Ryan A. Schneider; Benjamin C. Wiles

(57) ABSTRACT

A crane, in particular a tower crane, with a boom rotatable about an upright slewing gear axis and an out-of-service brake which permits and slows down the rotary movements of the boom in the out-of-service condition. The out-of-service brake is formed to operate in a rotational-speed-dependent manner such that with a greater rotational speed of the crane the applied braking torque is greater than with a smaller rotational speed of the crane.

29 Claims, 10 Drawing Sheets

(56) References Cited

FOREIGN PATENT DOCUMENTS

| | | | |
|---|---|---|---|
| DE | 2337397 | A1 | 2/1974 |
| DE | 2210806 | | 7/1976 |
| DE | 2337397 | | 10/1983 |
| EP | 1422188 | A1 | 5/2004 |
| EP | 1422188 | B1 | 2/2006 |
| EP | 2025637 | A1 | 2/2009 |
| EP | 2123590 | A1 | 11/2009 |
| JP | 2010083659 | A | 4/2010 |

OTHER PUBLICATIONS

The Chinese Office Action for related Chinese Patent Application No. 201310439156.5 dated Feb. 3, 2015.
German Search Report dated Jun. 6, 2013 for German Patent Application No. 202012009167.0.

* cited by examiner

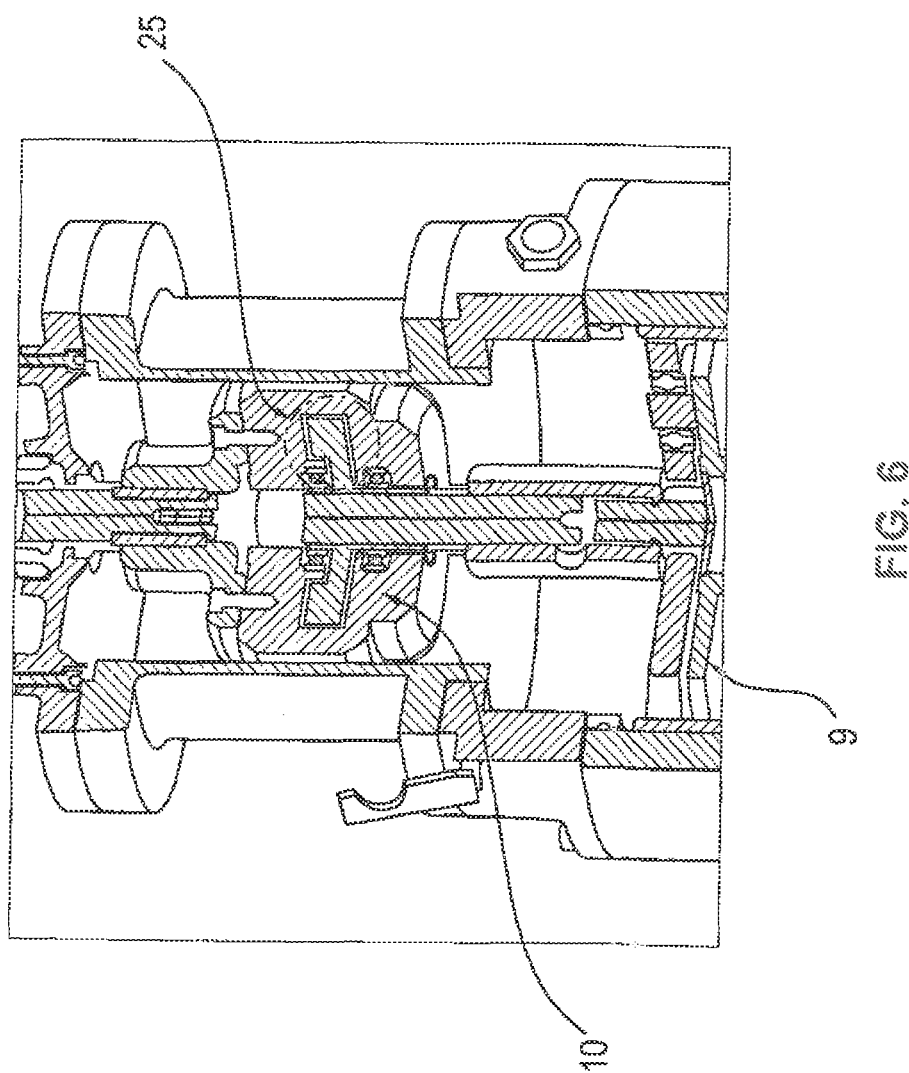

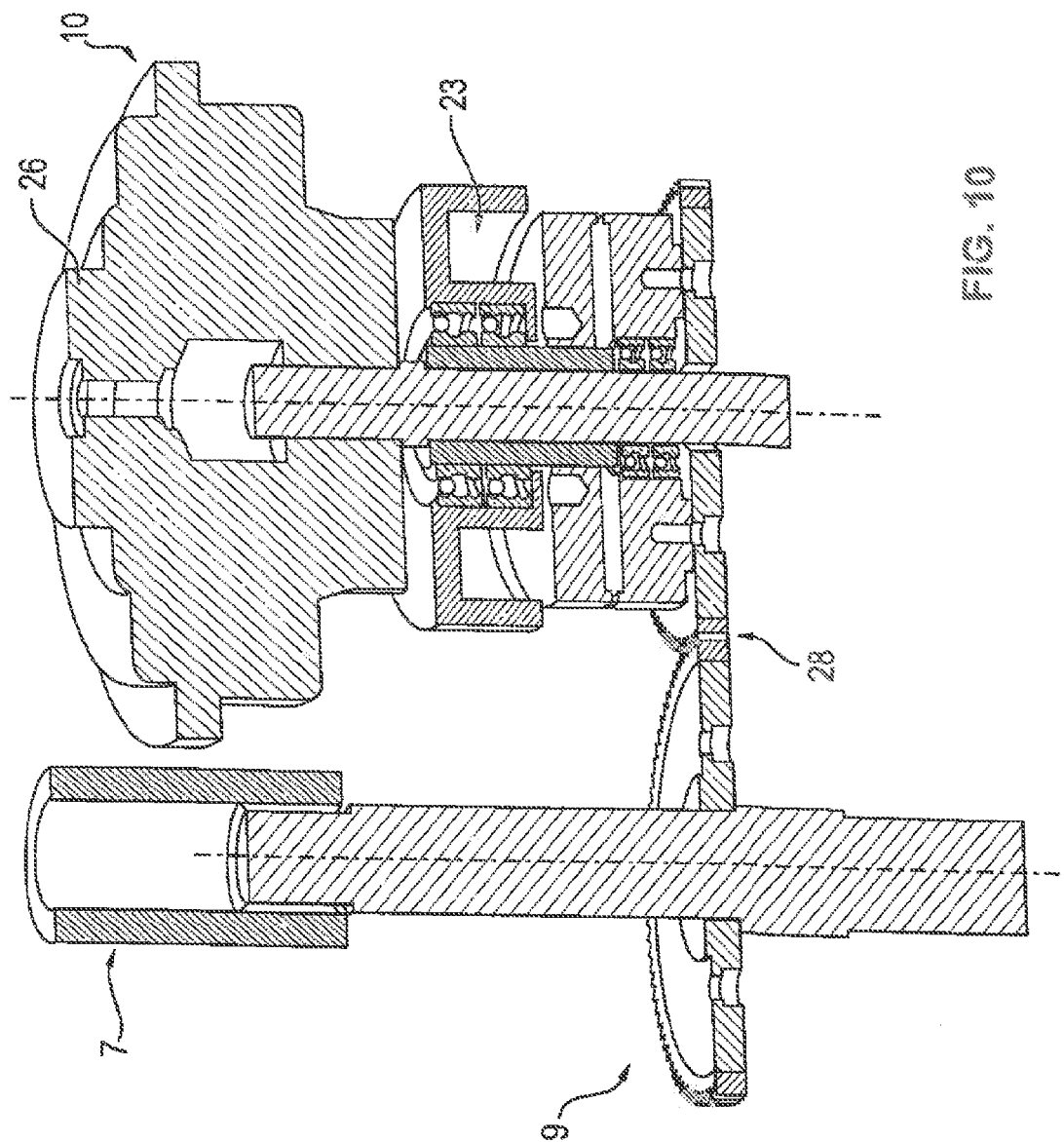

CRANE

CROSS-REFERENCE TO RELATED APPLICATIONS

This application claims the benefit of German Utility Model Application No. 20 2012 009 176.0 filed 24 Sep. 2012, the entire contents and substance of which are hereby incorporated by reference.

BACKGROUND OF THE INVENTION

1. Field of Invention

The present invention relates to a crane, in particular a tower crane, with a boom rotatable about an upright slewing gear axis and an out-of-service brake which permits and slows down the rotary movements of the boom in the out-of-service condition.

2. Background and Related Art

In tower cranes, but also in other crane types, the boom is rotatable about an upright slewing gear axis, wherein a slewing gear provided for this purpose can include a slewing drive for example in the form of an electric motor whose drive movement is converted into a rotary movement of the boom via a slewing gear transmission for example in the form of a planetary transmission. In so-called top-slewing cranes, the boom is rotated relative to the tower carrying the boom, while in so-called bottom-slewing cranes the entire tower along with the boom mounted thereon is rotated relative to the undercarriage or the supporting base.

In crane operation, the rotary movements are controlled by correspondingly actuating the slewing drive, wherein for braking and also for rotatorily fixing in a certain rotary position a slewing gear brake is provided. For safety reasons, such slewing gear brakes usually can be formed such that the brake is biased into its braking operating position for example by a corresponding spring means and can be vented by an actuator, in order to enable the rotatability.

In non-operation or in the out-of-service condition, when the crane is shut off, it is desirable however that the crane is able to rotate, in order to align itself in the wind into the most favorable rotary position for the respective wind direction. Since for example tower cranes due to their ballast usually are very much more stable against tilting movements in the boom plane than against tilting movements transversely to the boom planes going vertically through the boom, the crane should align itself such in strong wind that the wind comes from the rear and the boom is aligned with the wind as parallel as possible to the wind direction, since otherwise the crane would threaten to tip over or the crane would have to be ballasted in addition. To allow such automatic alignment in the wind, a wind-release device is associated to the service brake or slewing gear brake, which vents the brake usually biased into its braking position, when the crane is out of operation. This "end-of-work" position of the slewing gear brake can be adjusted by means of a manually actuatable control lever, but possibly also by a motorized venting drive, which can move the brake actuator into a locked non-braking position before shutting off the crane. Such wind-release device for the slewing gear brake of a tower crane is shown for example in the document EP 14 22 188 B1.

Under unfavorable wind conditions, however, the free rotatability of the crane in the out-of-service condition can lead to instabilities of the crane due to self-rotation. For example, when the crane is positioned between two buildings and only the boom or only the counter-boom is exposed to the wind, only the boom or the counter-boom each is unilaterally hit by the wind, whereby the crane can be put into a faster and faster rotation, since the crane does not stop when the boom has rotated out of the wind or before the counter-boom gets into the wind. As a result the boom and the counter-boom alternately can get into the wind, so that an amplification of this cyclic wind application can lead to an autorotation of the crane, which rotates the crane too fast and makes it tip over.

To avoid such unwanted autorotation, it has been proposed already to make the slewing gear rotate not entirely unbraked in the out-of-service condition, but to assign an additional brake to the slewing gear, which permits the rotary movement of the crane under wind, but slightly brakes the same, in order to mitigate the aforementioned autorotation problem. For example, it has been considered to provide a light-weight out-of-service brake at the output of the slewing gear transmission, which applies a limited braking torque against the crane rotation, which is smaller than the torque generated by wind application, so that the crane still is able to align itself in the wind, but only is able to rotate with a small speed of rotation.

Such an additional brake, however, is difficult to design in terms of the braking torque, in order to be equally suitable both for different wind conditions and for different crane positions. For example, with still moderate wind too high a braking torque can lead to the fact that the crane is not aligned properly, whereas with very unfavorable wind conditions with high wind velocities the same braking torque is not able to sufficiently inhibit the autorotation. In tower cranes with luffable boom, the luffing position in which the crane has been shut off also can have an influence on the required braking torque.

BRIEF SUMMARY OF THE INVENTION

Briefly described, in a preferred form, the present invention comprises an improved crane of the type mentioned above, which avoids the disadvantages of the prior art and develops the latter in an advantageous way. In particular for changing, difficult wind conditions and various crane configurations during shut-off of the crane, an autoration endangering the stability of the crane should safely be inhibited, but at the same time a free alignment of the crane in the wind should become possible.

According to the invention, the object is solved by a crane according to claim 1. Preferred aspects of the invention are subject-matter of the dependent claims.

Thus, it is proposed to form the out-of-service brake such that the braking torque is adapted to the requirements and the varying out-of-service conditions. When the conditions are such that the slewing of the crane threatens to be amplified to a dangerous autorotation, a higher braking torque is applied. When the crane, however, does not align itself sufficiently or only slowly into a preferred wind position, the braking torque is shut off or only a very small braking torque is applied. According to the invention, the out-of-service brake is formed to operate in a rotational-speed-dependent manner such that with a greater rotational speed of the crane the applied braking torque is greater than with a smaller rotational speed of the crane. When the crane does not rotate at all or the crane aligns itself too slowly in the wind, braking will not be effected at all or only more weakly, whereas on the other hand braking will be effected more strongly when the crane rotates too fast or starts to rotate too fast. As a result, the crane on the one hand always is able to rotate into the most favorable alignment to the wind, while on the other hand an amplifying autorotation is inhibited.

As regards the speed dependence, the out-of-service brake can be designed differently in principle, and for example a uniform, for example proportional dependence can be provided such that with increasing rotational speed of the crane the braking torque is increasing continuously. Alternatively, there can also be provided an incrementally growing braking torque, in particular such that with a rotational speed of the crane which is smaller than a predetermined limit speed, the out-of-service brake applies no braking torque or an only very small braking torque, which up to reaching the limit rotational speed of the crane can be constant or also can rise very slightly, whereas on exceeding of the predetermined rotational speed of the crane a distinctly greater braking torque and/or a braking torque stronger by one step is provided. In accordance with a development of the invention, mixed forms of the continuous rise and the incremental rise can be provided, for example such that up to a predetermined rotational speed of the crane no or an only very small braking torque is applied, for example, whereas on exceeding of the rotational speed of the crane a distinctly greater braking torque increasing more and more with increasing rotational speed will be applied.

In accordance with a development of the invention, the out-of-service brake is formed to operate currentless and/or is actuatable free from external energy. It hence is possible that in the condition of the crane shut off or in its out-of-service condition the out-of-service brake is ready for operation or can be actuated without further energy sources such as a battery or a mains connection.

In accordance with a development of the invention, the out-of-service brake can comprise a centrifugal brake, which converts the crane rotation into centrifugal forces which actuate the brake. In particular, the centrifugal brake can comprise flyweights, which are biased into a non-applied position, in particular radially to the inside, by a spring means and are connected with brake pads which the flyweights press into the braking position when there is sufficient centrifugal force.

By adjusting the biasing means which holds the flyweights in their starting position, the response of the centrifugal brake or the rotational speed from which the brake will grip can be controlled, wherein the biasing means in particular can be adjusted such that with slow crane rotations the brake does not respond at all and the crane can align itself freely in the wind. When the bias is compensated by the centrifugal forces, the braking effect will be noticed, wherein with further rising rotational speed of the crane due to the further increasing centrifugal forces the braking force or the braking torque will be further increased.

Advantageously, the flyweights of the centrifugal brake or the brake rotor connected therewith can be connected with the drive train of the slewing gear, which will also rotate when the crane rotates, while the stationary brake part or the brake stator, which can be formed as brake drum which is engaged by the brake pads, can be mounted in a rotatorily fixed or fixable manner.

In an alternative development of the invention, the out-of-service brake also can be formed in the manner of a viscous clutch/brake or include such viscous clutch/brake. Such viscous or fluid clutch operates according to a hydrodynamic principle and transmits torques between two parts rotating relative to each other in a hydrodynamic way. In particular, such viscous or fluid clutch can comprise a disk part, which is rotatably accommodated in a housing part, which is filled with fluid which due to a rotation of the disks relative to the housing part presses on the disks, which results in that with increasing relative rotational speed an increasing moment of resistance is generated, i.e. stator and rotor of such viscous or fluid clutch can slowly be rotated relatively easily, while an increasingly stronger resistance is applied against faster rotary movements.

In an advantageous way, the disk part of the viscous clutch/brake is formed as rotor or connected with the drive train of the slewing gear, which also rotates with the rotations of the crane, so that the disks rotate in dependence on the rotational speed of the crane. The housing part of the viscous clutch/brake, on the other hand, is arranged stationary or can be fixed rotatorily. Correspondingly, the effect or speed dependence can be utilized, which in the desired way applies a stronger braking torque against faster crane rotations than against slow crane rotations.

In principle, the out-of-service brake can act at or be connected to different points or portions of the slewing gear drive train. In accordance with a development of the invention, the out-of-service brake can be connected to the fast side of a slewing gear transmission, in particular to a portion of the drive train between drive motor and transmission input shaft or wheel. When a planetary transmission is used as slewing gear transmission, the out-of-service brake can be connected between a sun gear on the input side of the slewing gear transmission and the drive motor.

In accordance with a development of the invention, the out-of-service brake can be shut off for the crane operation, so as not to impede the slewing drive in crane operation or not to apply an unwanted resistance to the slewing drive in the case of wanted crane rotations in crane operation. The deactivation of the out-of-service brake for the crane operation in principle can be effected in different ways. For example, when a viscous clutch/brake as mentioned above is used and incorporated into the drive train between drive motor and slewing gear transmission, the deactivation means can comprise a jumper by means of which the viscous clutch/brake can be bridged, so that the drive movement of the drive motor can be passed onto the output shaft or the output gear of the drive train without impairment by the viscous clutch/brake. The jumper for example can comprise a switchable connector which non-rotatably connects the disk part with the housing part of the viscous clutch/brake, so that the torque is transmitted directly and without hydrodynamic offset.

As an alternative to such incorporation between drive motor and slewing gear transmission, the viscous clutch/brake also can be connected to the slewing gear transmission in the manner of a branch for example via a parallel shaft, wherein in this case the housing part of the viscous clutch/brake can be arranged rigidly mounted or fixable, whereas the rotor or the disk part can be connected to the slewing gear transmission, for example to its sun gear, via the parallel shaft. To be able to deactivate the viscous clutch/brake for the crane operation, the deactivation means can comprise clutch means by means of which the disk part or the rotor can be decoupled from the slewing gear transmission. Alternatively or in addition, the clutch means also can be used to release the housing part of the viscous clutch/brake, so that the viscous clutch can rotate freely in crane operation.

When a centrifugal brake is used as out-of-service brake, the same likewise can be connected in the drive train between drive motor and slewing gear transmission or slewing gear output shaft or gear, wherein in this case the deactivation means for deactivating the out-of-service brake for the crane operation likewise can comprise a blocking means which can block or lock the movability of the flyweights or brake pads, so that the same no longer can move into their braking position. In particular, the blocking means can retain the flyweights in their biased starting position, so that even under the influence of a centrifugal force the same no longer can press to the outside. In principle, however, it is also sufficient to merely block the movability to such an extent that a brake intervention no longer is possible. The blocking means here can be formed differently, for example in the form of a socket pin or a sliding sleeve, which hold the flyweights in their non-braking position.

Alternatively or in addition to such blocking of the flyweights, the centrifugal brake also can be deactivated in that the brake drum is switched off. In particular, the brake drum can be mounted in an axially shiftable manner, for example be non-rotatably, but axially shiftably guided in a toothing or in a spline profile, so that the brake drum can be moved away from the range of action of the flyweights and the brake pads mounted thereto, so that the flyweights push the brake pads into the void, so to speak. Alternatively or in addition, the deactivation means also can comprise a clutch by means of which the fixable brake drum can be released, so that it can rotate freely when the brake pads are applied and can produce no more braking effect.

Alternatively, the centrifugal brake also can be provided not directly in the drive train between drive motor and slewing gear output shaft, but can be connected to the drive train via a branch. In this case, the deactivation means as described above for the viscous clutch/brake can comprise coupling means for decoupling the rotor connected to the slewing gear drive train and/or the fixable stator of the centrifugal brake, in order to either decouple the entire centrifugal force clutch from the drive train or release the fixed brake stator, so that the centrifugal brake can rotate freely, if necessary.

In accordance with an advantageous development of the invention, the out-of-service brake can be provided in addition to a regular slewing gear service brake, which is utilized during the crane operation, in order to slow down rotary movements of the crane or hold the crane in a certain rotary position. In contrast to such slewing gear service brake, the out-of-service brake can be designed such that it does not hold the crane in a certain rotary position, but merely slows down rotary movements for example under wind force. This can be achieved in particular in that the out-of-service brake only applies a limited torque, which is distinctly smaller than the torque of the service brake. For example, the out-of-service brake can be designed such that it applies about ⅙ to ⅔, preferably about 40% to 60% of the maximum braking force of the slewing gear service brake. For example, when the slewing gear service brake is designed for generating a braking torque of 80 Nm, the out-of-service brake for applying a maximum braking torque—at the rotary speeds of the crane usually obtained under wind force—can apply about 40 Nm. Depending on the crane type and the conditions of use other values for the braking torque can of course also be expedient, wherein for many conditions of use a maximum braking force applied by the out-of-service brake can have about 50% of the maximum braking force of the slewing gear service brake.

In accordance with a development of the invention, the aforementioned deactivation means for deactivating the out-of-service brake for the crane operation can comprise a hand actuating device, which provides for a manual deactivation and/or activation of the out-of-service brake. Alternatively or in addition to such hand actuating device, an actuator to be actuated by external energy can be associated to the out-of-service brake, by means of which the deactivation and/or activation of the out-of-service brake can be carried out with external energy. For example, an electric motor can reciprocate the aforementioned jumper for bridging the out-of-service brake between its bridging position and its non-bridging position, or can move rotation blocking means for blocking the rotatability of the parts of the out-of-service brake rotatable relative to each other into the blocking position or into the non-blocking position, and/or can engage and disengage the aforementioned coupling means for decoupling the out-of-service brake.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which:

FIG. 5a shows the retaining means can comprise an axially adjustable bolt engaging a recess in a respective flyweight, and FIG. 5b shows the bolt brought out of engagement by the flyweight, FIG. 6 shows a schematic sectional view of a further out-of-service brake in the form of a viscous clutch/brake according to a further embodiment of the invention, wherein the viscous clutch/brake is integrated into the drive train between drive motor and slewing gear transmission, FIG. 10 shows a schematic, partial sectional representation of the connection of an out-of-service brake in the form of a viscous clutch/brake, which is not directly integrated into the drive train between drive motor and slewing gear transmission, but is connected via a transmission branch, wherein the out-of-service brake can be switched on or off by a magnetic clutch.

DETAILED DESCRIPTION OF THE INVENTION

Figure 1:
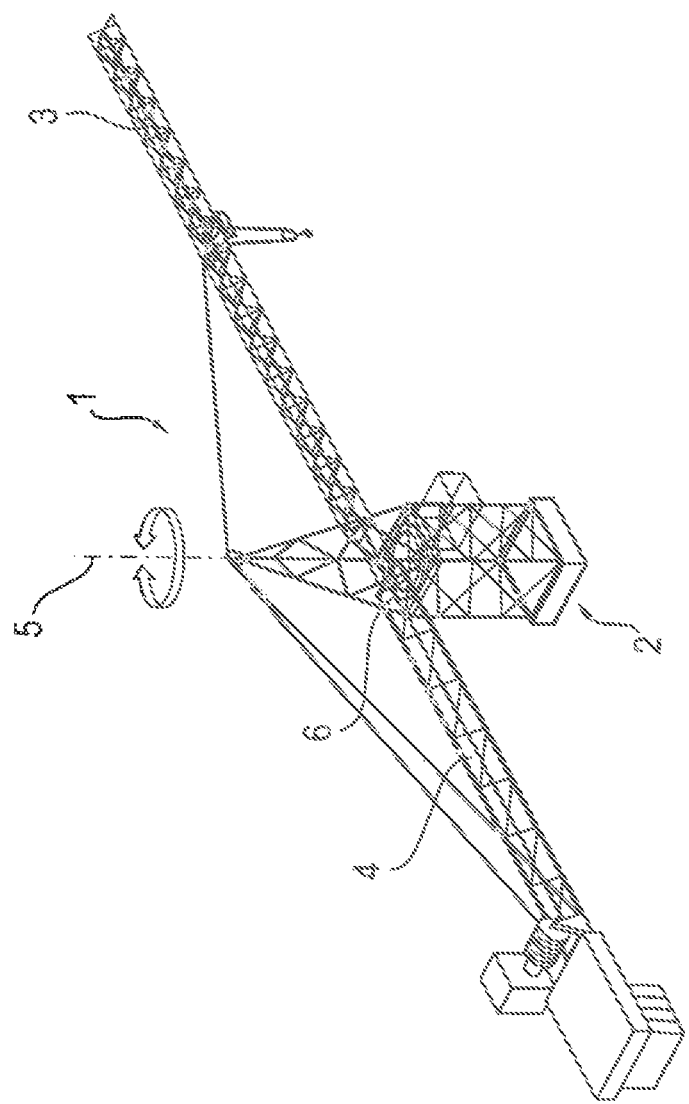
FIG. 1 shows a perspective, partial representation of a tower crane according to an advantageous embodiment of the invention, which is formed as top-slewing crane and includes a slewing gear for rotating the boom relative to the tower.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

As shown in FIG. 1, the concrete crane can be a tower crane 1 formed as so-called top-slewing crane, whose tower 2 carries a boom 3 and a counter-boom 4, which extend substantially horizontally and are rotatable relative to the tower 2 about an upright tower axis 5. Instead of the crane configuration shown in FIG. 1, the tower crane 1 might however also be formed as bottom-slewing crane and/or comprise a luffable pointed boom and/or be braced towards the tower base or upper carriage via a bracing.

To be able to rotate the boom 3, a slewing gear 6 is provided, which in the illustrated embodiment is provided at the upper end of the tower 2 between the boom 3 and the tower 2 and can comprise a ring gear with which a drive gear driven by a drive motor 2 is meshing.

Figure 2:
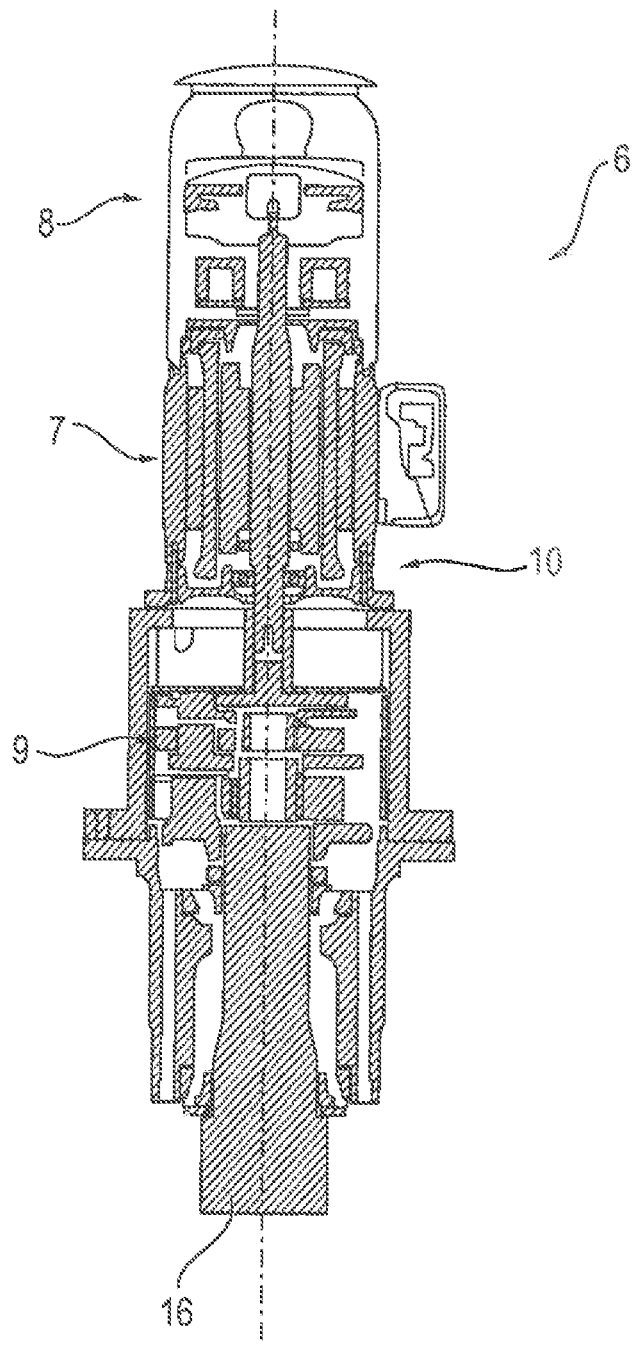
FIG. 2 shows a schematic principal sectional view of the slewing gear of the tower crane of FIG. 1, wherein the electric motor and the slewing gear service brake associated thereto as well as the slewing gear transmission connected with the drive motor are shown, wherein the additional out-of-service brake can be provided between slewing gear transmission and drive motor.

An advantageous embodiment of the drive means of the slewing gear 6 is shown in FIG. 2 and can comprise a preferably electric drive motor 2 which drives an output shaft 16 via a slewing gear transmission 9, wherein the arrangement of the slewing gear components can be made such that the output shaft 16 is arranged parallel, in particular coaxially to the motor shaft of the drive motor 2. In an advantageous embodiment, the slewing gear transmission 9 can be a planetary transmission, in order to step down/step up the speed of the drive motor 2 into a speed of the output shaft 16 in the desired way.

To be able to slow down rotary movements of the boom 3 in crane operation and/or to hold an obtained rotary position of the boom 3, the slewing gear 6 comprises a slewing gear service brake 8, which advantageously can be arranged on the input side of the slewing gear transmission 9 and in particular can be associated to the drive motor 2, in order to brake the drive motor 2 itself or hold it in a certain position. The service brake 8, as shown in FIG. 2, for example can be arranged on a side of the drive motor 2 facing away from the slewing gear transmission 9 and can sit on or engage a drive shaft stub prolonged through the drive motor 2. In a manner known per se, the service brake 8 can comprise a friction-disk or multi-disk brake means, which is biased into the braking position by a biasing means and can be vented by an electric actuator for example in the form of an electromagnet, in order to release the brake.

In addition to this service brake 8, the slewing gear 6 comprises an out-of-service brake 10 which should brake rotary movements of the boom 3 in the out-of-service condition of the crane shut off, but should permit the same to provide for a self-alignment of the crane or its boom 3 under wind loads. Depending on the formation of the out-of-service brake 10, the service brake 8 can be vented, i.e. be released, by a wind-release device in the out-of-service condition, or also remain in its biased braking position, in which the drive motor 7 is blocked, so that in this case a wind-release device for venting the service brake can be omitted.

The out-of-service brake 10 advantageously can be integrated into the slewing gear 6 between the drive motor 2 and the slewing gear transmission 9 or be connected to a portion of the drive train of the slewing gear 6 between drive motor 7 and slewing gear transmission 9. This allows to utilize a compact arrangement while simultaneously utilizing the speed increase and the torque reduction of the slewing gear transmission 9 for the out-of-service brake 10.

Figure 3:
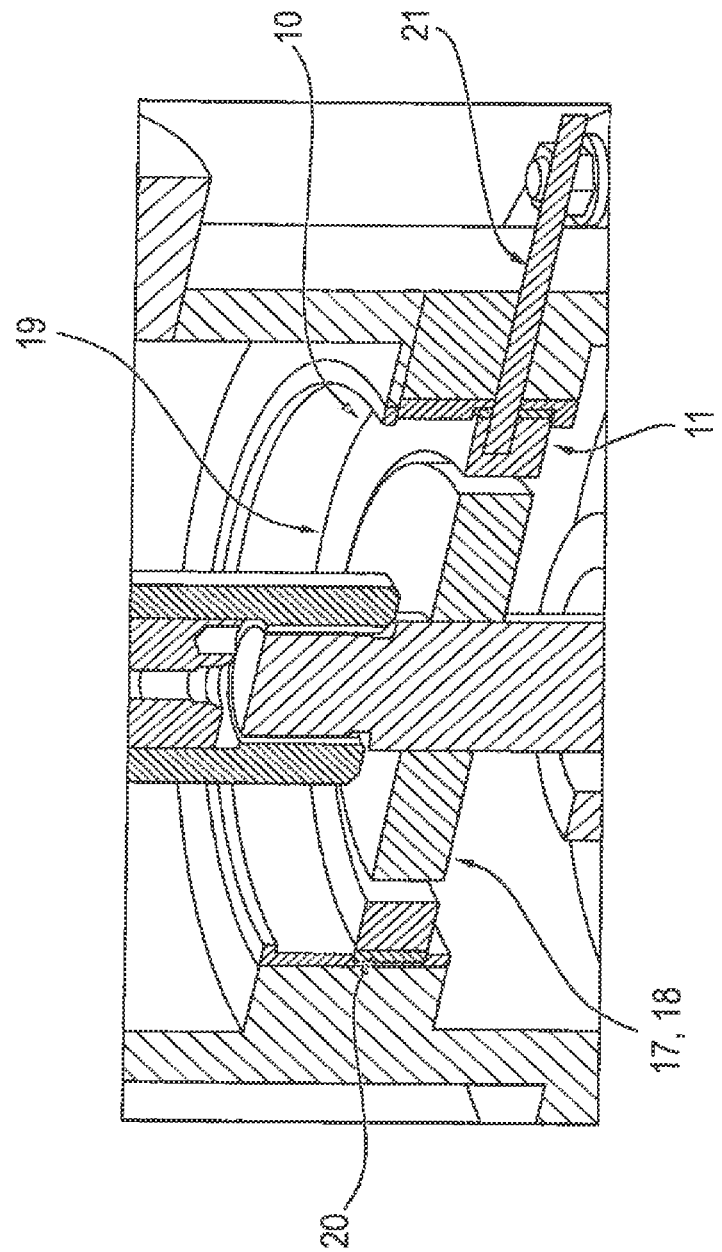
FIG. 3 shows a schematic sectional view of the out-of-service brake integrated into the slewing gear of FIG. 2, which according to FIG. 3 is formed as centrifugal brake which comprises a switchable brake ring for deactivating the out-of-service brake.

As shown in FIG. 3, the out-of-service brake 10 can be formed as centrifugal brake which comprises a hub sitting on the transmission shaft of the slewing gear 6, on which radially movable flyweights 17 with brake pads 18 attached thereto are mounted, so that during rotation of the brake hub the flyweights 17 together with the brake pads 18 move radially to the outside. Via a biasing means preferably in the form of a spring means, the flyweights 17 are biased radially to the inside into the non-braking position, so that the braking effect will start only from a predetermined speed, when the centrifugal forces are large enough to overcome the bias.

The brake pads 18 mounted on the flyweights 17 cooperate with a brake stator in the form of a brake drum 19, which is non-rotatably mounted, for example non-rotatably connected with a slewing gear housing 6.

To be able to deactivate the centrifugal brake for the regular crane operation, the brake drum 19 can be formed to be axially adjustable, so that it can be moved away from the range of action of the flyweights 17 or the brake pads 18 attached thereto. For this purpose, as shown in FIG. 3, the brake drum 19 can non-rotatably, but axially movably be mounted on the slewing gear housing 6 via a toothing 20. The axial adjustment can be effected either manually via a hand actuating device 21, which for example can comprise an adjusting lever extending in an inclined groove, and/or can be adjusted axially by means of an actuating drive for example in the form of an electric spindle drive and/or an electromagnet, for example such that the brake drum 19 is biased into the braking position by means of a biasing means, in order to be in the proper position in the out-of-service condition of the crane shut off, whereas by energizing an electromagnet the brake drum 19 can be moved into the deactivated position, so as not to impede wanted rotary movements during the crane operation.

Figure 4:
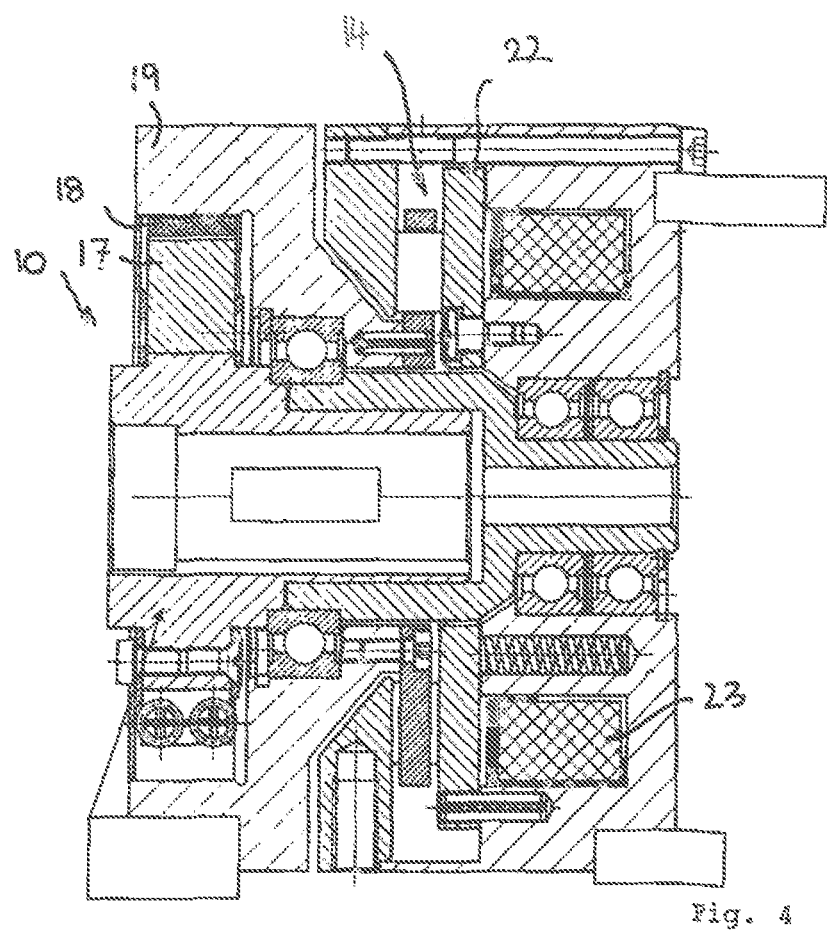
FIG. 4 shows a sectional view of an out-of-service brake in the form of a centrifugal brake according to a further embodiment of the invention, which can be deactivated electrically by means of an electromagnet.

As shown in FIG. 4, a deactivation of the centrifugal brake also can be achieved without axial adjustability of the brake drum 19, in particular due to the fact that the brake drum 19 as such is rotatably mounted. The deactivator can comprise an assembly, for example, a coupler, or the deactivator can comprise deactivation means 11 in this case advantageously a coupling means 14, by means of which the brake drum 19 can be fixed so as not to rotate, or can be released, i.e. be switched to rotate. For this purpose, the coupling means 14 for example can comprise an axial coupling whose axially adjustable coupling part 22 is biased by a biasing device for example in the form of a spring means into the engaged position, i.e. the position blocking the brake drum 19, and by an actuator for example in the form of an electromagnet 23 can be disengaged, i.e. be brought into the position no longer blocking the brake drum 19.

In this embodiment, the flyweights 17 and the brake pads 18 attached thereto still can get in engagement with the brake drum 19. When the coupling 14 is disengaged, however, this has no more braking effect, since the brake drum 19 then no longer is fixed, but rotates freely.

Figure 5B:
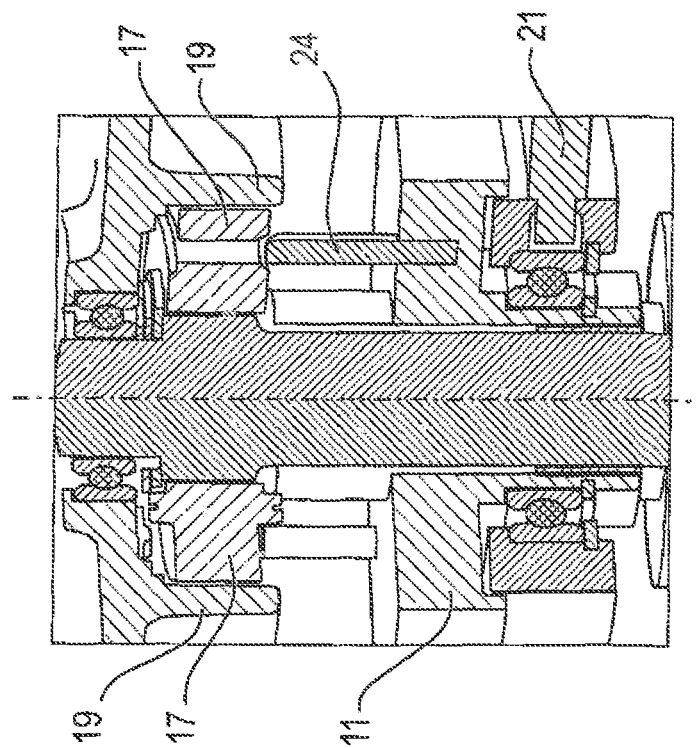
FIGS. 5a and 5b show partial schematic sectional views of an out-of-service brake in the form of a centrifugal brake according to further embodiments of the invention.
Figure 5A:
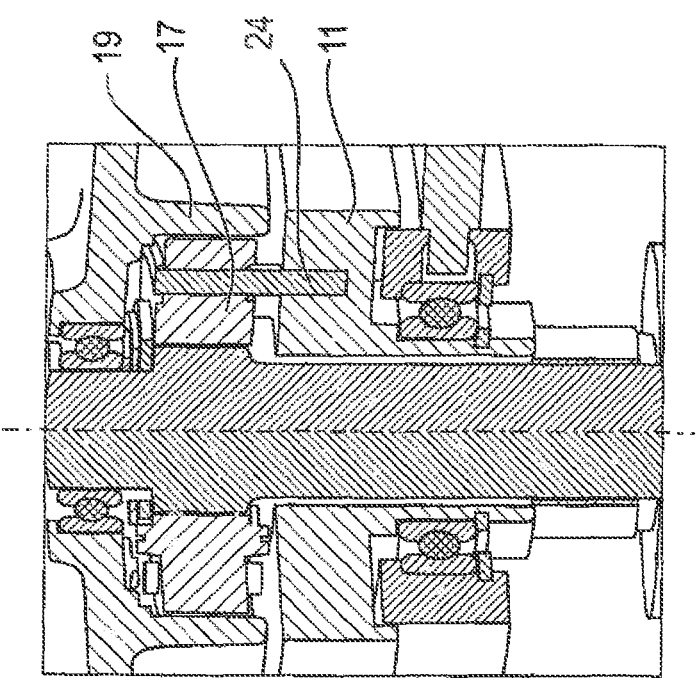

As shown in the two views (a) and (b) of FIG. 5, the centrifugal brake also can be deactivated in that the flyweights 17 are blocked in their movement to such an extent that they can no longer be driven into a braking position. The deactivation means 11 can comprise retaining means for example in the form of a socket pin, which can retain the flyweights 17 in a non-braking position. As shown in FIG. 5(*a*), the retaining means can comprise an axially adjustable bolt 24 which can engage into a recess in a respective flyweight 17, so that the same no longer can move radially to the outside into the braking position. However, when the bolt 24 or the corresponding retaining means, which can also be formed as sleeve or the like, is brought out of engagement by the flyweights 17 as shown in FIG. 5(*b*), in that a corresponding axial adjustment is made, the flyweights 17 again can operate and brake as usual.

Figure 7:
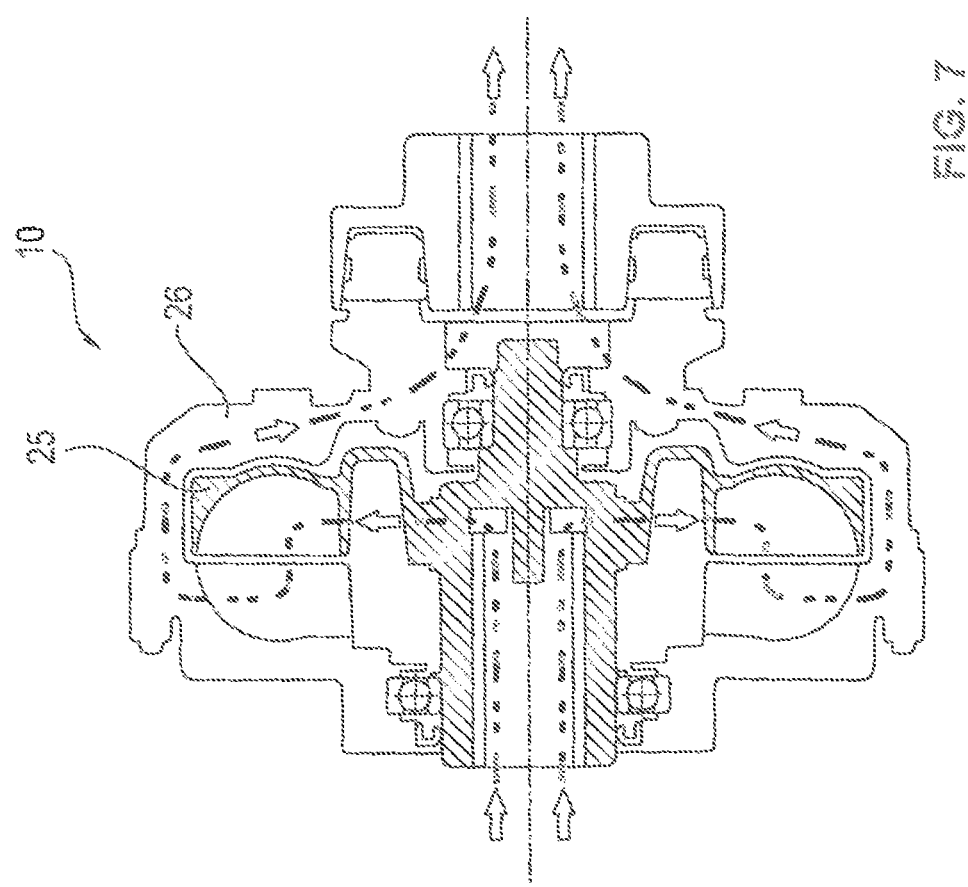
FIG. 7 shows a schematic sectional view of the viscous clutch/brake of FIG. 6, which shows the disk part and the housing part of the clutch and the path of the torque transmission.
Figure 8:
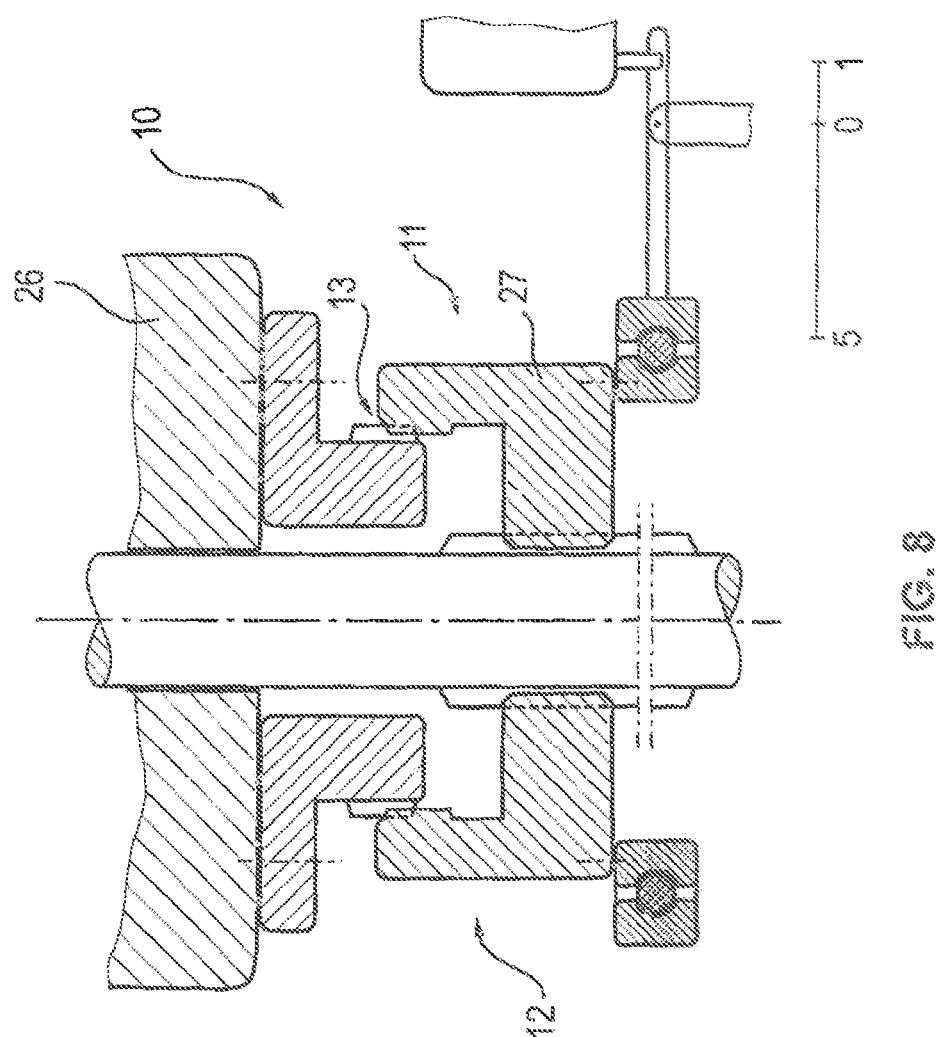
FIG. 8 shows a partial sectional view of the viscous clutch/brake and a selector sleeve associated to the same for bridging or blocking the viscous clutch/brake.

An alternative embodiment of the invention is shown in FIG. 6, according to which the out-of-service brake 10 is formed as fluid clutch or viscous clutch/brake, which similar to the above-described centrifugal brake can be integrated into the slewing gear 6, in particular between the drive motor 2 and the slewing gear transmission 9. As shown in FIG. 7, the viscous clutch/brake can comprise a disk part 25 which comprises a plurality of disks sitting closely one beside the other and is rotatably accommodated in a housing part 26. The connection and the torque transmission is effected via a fluid which is present in the cavity of the housing part 26 and in the disks of the disk part 25. This fluid, in general oil, is pressed to the outside into the disks by a relative rotation of disk part 25 to housing part 26 and the resulting centrifugal force. Due to the rotation, a pressure is exerted on the disks of the housing, wherein the housing part 26 also starts to rotate. With increasing speed and hence increasing centrifugal force, the resistance to the relative rotation is increasing more and more, i.e. the speeds of the two components more and more approach each other.

Advantageously, the disk part 25 is coupled to the transmission shaft of the slewing gear transmission 9, which leads to the drive motor 2, wherein possibly however a coupling to other rotary parts such as transmission gear wheels might also be effected.

The housing part 26 on the other hand is fixedly mounted or can be fixed rotatorily in the out-of-service condition of the crane. This can be effected in a simple way in that the housing part 26 is non-rotatably coupled with the drive motor 7, which in the out-of-service condition in turn can be fixed by the service brake 8 of the slewing gear 6. In this case, a release device for enabling crane rotations in the wind can be saved or omitted, since the viscous clutch/brake provides for the wind release.

To deactivate the viscous clutch/brake in crane operation, the deactivation means 11 can comprise a jumper 12, which rotatorily blocks the housing part 26 with the disk part 25 of the viscous clutch/brake, i.e. prevents a relative rotation of rotor and stator of the viscous clutch/brake. In crane operation, the torque of the drive motor correspondingly is transmitted directly via the rotatorily blocked viscous clutch. Such jumper 12 for example can comprise a sliding sleeve 27, which for example via a spline profile or a toothing is non-rotatably, but axially shiftably connected with the transmission shaft with which the disk part 25 is coupled. When the sliding sleeve 27 is moved onto the housing part 25 or brought in non-rotatable engagement therewith, for example via corresponding toothings, the viscous clutch is blocked and deactivated for the crane operation.

The jumper 12 thus forms connecting means 13 for the non-rotatable connection of the disk part 25 with the housing part 26.

Figure 9:
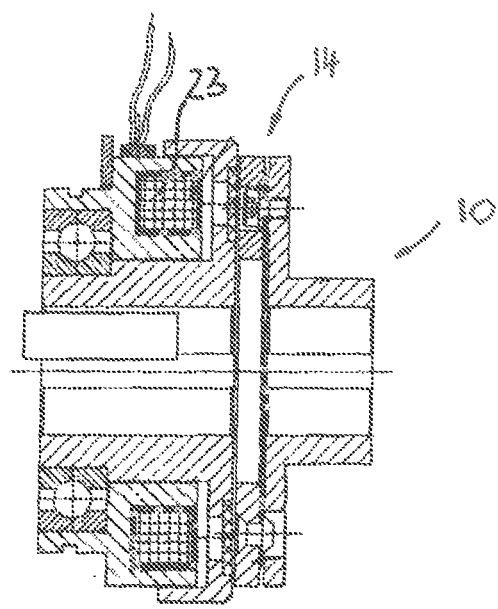
FIG. 9 shows a sectional view of an electrically or electromagnetically actuatable clutch for switching the viscous clutch/brake on and off according to a further embodiment of the invention.

Instead of such sliding sleeve 27 an axial coupling 14 can also be provided, in order to block the viscous clutch for the crane operation, as is shown in FIG. 9. An axially adjustable coupling element can be biased into a locking position for example by a spring means or a similar biasing means and be vented by an actuator for example in the form of an electromagnet 23, so that the viscous clutch no longer is blocked.

As shown in FIG. 10, the out-of-service brake 10 for example in the form of the described viscous clutch/brake also can be integrated not directly into the drive train of the slewing gear 6 between drive motor 7 and slewing gear transmission 9, but can be connected to the slewing gear 6 or the slewing gear transmission 9 via a transmission branch parallel to the drive motor 2, for example via the spur gear pair 28 shown in FIG. 10, which drives the shaft of the viscous clutch/brake or its disk part 25. The housing part 26 in turn can be fixed rotatorily. To be able to deactivate the viscous clutch/brake for the crane operation, a coupling 14, for example in the form of an axial coupling as described above, can be provided similar to the way described above, by means of which the disk part 25 or the viscous clutch/brake can be decoupled, so that it will no longer rotate even with a rotation of the slewing gear 6.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A crane comprising:
    a boom rotatably mounted about an upright axis of rotation; and
    an out-of-service brake that permits and slows down rotary movements of the boom in an out-of-service condition of the crane;
    wherein the out-of-service brake is adapted to operate in a rotational-speed-dependent manner such that an applied braking torque is greater at a greater rotational speed of the crane than at a lower rotational speed of the crane.

2. The crane according to claim 1, wherein the crane is a tower crane.

3. The crane according to claim 1, wherein an out-of-service condition of the crane comprises an out-of-service condition of the crane under wind loads.

4. The crane according to claim 1, wherein the out-of-service brake is further adapted such that up to a predetermined rotational speed of the boom, the applied braking torque is smaller than a predetermined torque, wherein the predetermined torque is generated by a predetermined wind load on the crane, and only upon exceeding the predetermined rotational speed of the boom, the applied braking torque is greater than the torque generated by a wind load on the crane.

5. The crane according to claim 1, wherein the out-of-service brake is further adapted such that with increasing rotational speed of the boom, the applied braking torque rises.

6. The crane according to claim 1, wherein the out-of-service brake is further adapted such that with increasing rotational speed of the boom, the applied braking torque rises one of continuously and incrementally.

7. The crane according to claim 1, wherein the out-of-service brake is further adapted to operate in a self-applying manner free from external energy and/or external current.

8. The crane according to claim 1, wherein the out-of-service brake comprises a centrifugal brake.

9. The crane according to claim 8, wherein the centrifugal brake comprises a brake drum and flyweights with brake pads rotating with rotary movements of the boom, wherein the brake pads are adapted to be urged against the brake drum.

10. The crane according to claim 1, wherein the out-of-service brake comprises a viscous clutch/brake.

11. The crane according to claim 10, wherein the viscous clutch/brake comprises a housing part and a disk part rotating with rotary movements of the boom.

12. The crane according to claim 1 further comprising a deactivator for deactivating the out-of-service brake in crane operation.

13. The crane according to claim 1 further comprising a slewing gear with a drive train, wherein the out-of-service brake is integrated into the drive train of the slewing gear.

14. The crane according to claim 1 further comprising:
    a deactivator for deactivating the out-of-service brake in crane operation; and
    a slewing gear with a drive train;
    wherein the deactivator comprises a coupling for one or both decoupling at least a part of the out-of-service brake from the drive train of the slewing gear and decoupling a rotatorily fixable brake part from a non-rotatable base part.

15. The crane according to claim 1 further comprising a slewing gear service brake that is provided for slowing down rotary movement of the boom in crane operation.

16. The crane according to claim 15, wherein the out-of-service brake applies a braking torque that is smaller than a maximum braking torque of the slewing gear service brake.

17. The crane according to claim 16, wherein the out-of-service brake applies a braking torque that amounts to about 30% to 70% of a maximum braking torque of the slewing gear service brake.

18. The crane according to claim 16, wherein the out-of-service brake applies a braking torque that amounts to about 40% to 60% of a maximum braking torque of the slewing gear service brake.

19. The crane according to claim 1, wherein the out-of-service brake is integrated into a power-transmitting drive train of a slewing gear.

20. The crane according to claim 1, wherein the out-of-service brake is one or both connected to a slewing gear transmission via a transmission branch and is arranged parallel to a drive motor of a slewing gear.

21. A crane comprising:
    a boom rotatable mounted about an upright axis of rotation; and
    an out-of-service brake that permits and slows down rotary movements of the boom in an out-of-service condition of the crane;
    wherein the out-of-service brake is adapted to operate in a rotational-speed-dependent manner such that an applied braking torque is greater at a greater rotational speed of the crane than at a lower rotational speed of the crane; and
    wherein on an input side of a slewing gear transmission the out-of-service brake is connected to a drive train of a slewing gear, which leads from a slewing drive to an output element of the slewing gear.

22. The crane according to claim 21, wherein the out-of-service brake is provided between a drive motor and an input element of the slewing gear transmission.

23. A crane comprising:
    a boom rotatably mounted about an upright axis of rotation;
    an out-of-service brake that permits and slows down rotary movements of the boom in an out-of-service condition of the crane; and
    a deactivator for deactivating the out-of-service brake in crane operation;
    wherein the out-of-service brake is adapted to operate in a rotational-speed-dependent manner such that an applied braking torque is greater at a greater rotational speed of the crane than at a lower rotational speed of the crane; and
    wherein the deactivator comprises a brake lock for locking a movable brake part of the out-of-service brake formed as a centrifugal brake.

24. A crane comprising:
    a boom rotatably mounted about an upright axis of rotation;
    an out-of-service brake that permits and slows down rotary movements of the boom in an out-of-service condition of the crane; and
    a deactivator for deactivating the out-of-service brake in crane operation;

wherein the out-of-service brake is adapted to operate in a rotational-speed-dependent manner such that an applied braking torque is greater at a greater rotational speed of the crane than at a lower rotational speed of the crane; and wherein the deactivator comprises an axial positioning means for axially shifting a brake part of the out-of-service brake formed as a centrifugal brake into a non-engagement position.

25. A crane comprising:

a boom rotatable mounted about an upright axis of rotation;

an out-of-service brake that permits and slows down rotary movements of the boom in an out-of-service condition of the crane; and a slewing gear with a drive train, wherein the out-of-service brake is integrated into the drive train of the slewing gear;

wherein the out-of-service brake is adapted to operate in a rotational-speed-dependent manner such that an applied braking torque is greater at a greater rotational speed of the crane than at a lower rotational speed of the crane; and wherein the out-of-service brake comprises a viscous clutch/brake connected to a portion of the drive train of the slewing gear between a drive motor and a slewing gear transmission.

26. The crane according to claim 25 further comprising a deactivator for deactivating the viscous clutch/brake in crane operation, wherein the deactivator comprises a jumper for one or both of bridging the viscous clutch/brake and rotatorily blocking parts of the viscous clutch/brake rotatable relative to each other.

27. The crane according to claim 26, wherein the jumper comprises a connector for non-rotatably connecting input and output parts of the viscous clutch/brake.

28. The crane according to claim 27, wherein the connector comprises one or both of a toothed sliding sleeve and a magnetic coupling part.

29. The crane according to claim 25, wherein a housing part of the viscous clutch/brake is non-rotatably coupled with the drive motor of the slewing gear, which drive motor is adapted to be fixed in the out-of-service condition by a service brake, wherein the slewing gear is formed free from a release device for releasing the service brake.

* * * * *